(12) United States Patent
Lee et al.

(10) Patent No.: US 9,807,762 B2
(45) Date of Patent: Oct. 31, 2017

(54) METHOD AND DEVICE FOR ALLOCATING RESOURCES

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 75 days.

(21) Appl. No.: 14/417,068

(22) PCT Filed: Jul. 18, 2013

(86) PCT No.: PCT/KR2013/006447
§ 371 (c)(1),
(2) Date: Jan. 23, 2015

(87) PCT Pub. No.: WO2014/017780
PCT Pub. Date: Jan. 30, 2014

(65) Prior Publication Data
US 2015/0282164 A1 Oct. 1, 2015

(30) Foreign Application Priority Data

Jul. 25, 2012 (KR) .......................... 10-2012-0081383

(51) Int. Cl.
*H04W 72/04* (2009.01)
*H04W 72/08* (2009.01)
(Continued)

(52) U.S. Cl.
CPC ....... *H04W 72/0446* (2013.01); *H04L 1/0003* (2013.01); *H04L 1/0009* (2013.01);
(Continued)

(58) Field of Classification Search
CPC . H04W 72/0446; H04W 72/08; H04W 28/24; H04W 88/02; H04W 88/08; H04L 1/0003; H04L 1/0009; H04L 5/0032; H04L 5/0044; H04L 5/0069; H04L 5/0073
See application file for complete search history.

(56) References Cited

U.S. PATENT DOCUMENTS

| 6,038,450 A | 3/2000 | Brink et al. |
| 2008/0225752 A1* | 9/2008 | Kwon ................. H04W 72/048 370/254 |

(Continued)

FOREIGN PATENT DOCUMENTS

| JP | 2008-141244 A | 6/2008 |
| JP | 2010-524340 A | 7/2010 |

(Continued)

*Primary Examiner* — Ian N Moore
*Assistant Examiner* — Latresa McCallum
(74) *Attorney, Agent, or Firm* — IP Legal Services, LLC (57) ABSTRACT

The present disclosure relates to resource allocation method and apparatus. The resource allocation method includes monitoring resource information of a plurality of base stations including a first base station and a second base station, receiving a resource allocation request from a first terminal that is located in a boundary region and connected to the first base station, and checking whether a second terminal using a voice service is located in the boundary region. When the second terminal is located in the boundary region, resources are allocated to the first terminal based on resources allocated to the second terminal. The boundary region is an overlapped region of cells of the first base station and the second base station.

9 Claims, 11 Drawing Sheets (51) Int. Cl.
  *H04L 1/00*    (2006.01)
  *H04L 5/00*    (2006.01)
  *H04W 88/02*    (2009.01)
  *H04W 88/08*    (2009.01)
  *H04W 28/24*    (2009.01)

(52) U.S. Cl.
  CPC .......... *H04L 5/0032* (2013.01); *H04L 5/0044* (2013.01); *H04L 5/0069* (2013.01); *H04L 5/0073* (2013.01); *H04W 72/08* (2013.01); *H04W 28/24* (2013.01); *H04W 88/02* (2013.01); *H04W 88/08* (2013.01)

(56) References Cited

U.S. PATENT DOCUMENTS

| | | |
|---|---|---|
| 2008/0240151 A1 | 10/2008 | Chitrapu et al. |
| 2008/0311921 A1* | 12/2008 | Eckert ............... H04W 76/066 455/450 |
| 2009/0092103 A1 | 4/2009 | Rao |
| 2009/0323625 A1 | 12/2009 | Lee et al. |
| 2010/0074359 A1 | 3/2010 | Tanigawa et al. |
| 2011/0255526 A1 | 10/2011 | Kaneko et al. |
| 2012/0106433 A1 | 5/2012 | Seo et al. |
| 2012/0182913 A1* | 7/2012 | Kreuzer ............... H04W 28/06 370/311 |
| 2013/0272245 A1 | 10/2013 | Chitrapu et al. |

FOREIGN PATENT DOCUMENTS

| | | |
|---|---|---|
| KR | 10-2008-0083587 A | 9/2008 |
| KR | 10-2009-0110493 A | 10/2009 |
| KR | 10-2010-0066282 A | 6/2010 |
| KR | 10-2011-0055015 A | 5/2011 |
| KR | 10-2011-0089860 A | 8/2011 |
| KR | 10-2011-0097999 A | 8/2011 |

* cited by examiner

METHOD AND DEVICE FOR ALLOCATING RESOURCES

CROSS REFERENCE TO RELATED APPLICATIONS

This application is a National Stage Patent Application of PCT International Patent Application No. PCT/KR2013/006447 (filed on Jul. 18, 2013) under 35 U.S.C. §371, which claims priority to Korean Patent Application No. 10-2012-0081383 (filed on Jul. 25, 2012), the teachings of which are incorporated herein in their entireties by reference.

TECHNICAL FIELD

The present disclosure relates to a method and an apparatus for allocating resources.

BACKGROUND ART

Long Term Evolution (LTE) may allocate resources to a terminal according to dynamic scheduling (DS) or semi-persistent scheduling. The dynamic scheduling is a resource allocation scheme that finds an optimal channel at each transmission time interval (TTI), in order to maximize channel capacity. However, such a dynamic scheduling may saturate a control region if the dynamic scheduling allocates a plurality of small packets at a data region.

The semi-persistent scheduling does not allocate resources at each TTI. The semi-persistent scheduling uses a fixed resource allocation position and a fixed transmission scheme (e.g., modulation and coding scheme). The semi-persistent scheduling may reduce consumption of a Physical Downlink Control Channel (PDCCH). However, the semi-persistent scheduling may not maximize channel capacity.

A typical resource allocation apparatus and method may allocate resources without having resource allocation information of neighbor cells. Therefore, such a typical resource allocation apparatus and method may degrade voice service quality due to inter-cell mutual interference. In order to avoid such inter-cell interference problem, the typical resource allocation apparatus and method may allocate radio resources more than needed, which may reduce the number of users of a voice service. In addition, the inter-cell interference may cause transmission error and degrade data service quality.

DISCLOSURE

Technical Problem

The present embodiments have been made in an effort to provide a method and an apparatus for allocating voice resources without interference of a neighbor cell by integrally managing resources of a plurality of cells.

Technical Solution

An exemplary embodiment of the present invention provides a method for allocating resources. The method may include monitoring resource information of a plurality of base stations including a first base station and a second base station, receiving a resource allocation request from a first terminal that is located in a boundary region and connected to the first base station, checking whether a second terminal using a voice service is located in the boundary region, and when the second terminal is located in the boundary region, allocating resources to the first terminal based on resources allocated to the second terminal. The boundary region may be an overlapped region of cells of the first base station and the second base station.

The second terminal may be located in the boundary region and is connected to the second base station to use the voice service.

The resources allocated to the second terminal may be resources allocated at a predetermined interval with a fixed resource allocation position and a fixed transmission scheme.

In the allocating of the resources of the first terminal, the resources of the first terminal may be allocated while avoiding the resources allocated to the second terminal.

For positions different from resources allocated to the second terminal, the allocating of the resources of the first terminal may include allocating resources to the first terminal using a first level of a modulation and coding scheme. For positions identical to the resources allocated to the second terminal, the allocating of the resources of the first terminal may include allocating resources to the first terminal using a second level of a modulation and coding scheme, which is lower than the first level of the modulation and coding scheme. The second level of the modulation and coding scheme may be a scheme transmitting less data than the first level of the modulation and coding scheme.

Another embodiment of the present invention provides a method for allocating resources. The method may include receiving a resource allocation request for a voice service of a first terminal, allocating first resources having a fixed resource allocation position and a fixed transmission scheme to the first terminal, receiving a resource allocation request of a second terminal which is adjacent to the first terminal, and allocating second resources different from the first resources to the second terminal. The first terminal and the second terminal may be connected to different base stations.

The method may further include monitoring resource information of a plurality of base stations including the base stations to which the first terminal and the second terminal are connected.

The first terminal may be connected to a first base station, the second terminal may be connected to a second base station, and the first terminal and the second terminal may be located at a boundary region where cells of the first base station and the second base station are overlapped.

The allocating of the first resources may include fixing resource positions of the voice service to a certain subframe and allocating the first resources for the voice service of the first terminal to the certain subframe. The certain subframe may be a subframe which is repeated at a predetermined interval.

In the allocating of the second resources, the second resources for the data service of the second terminal may be allocated while avoiding the certain subframe.

The method may further include receiving a resource allocation request for a voice service of a third terminal, and allocating third resources for the voice service of the third terminal to the certain subframe.

Yet another embodiment of the present invention provides a method for allocating resources. The method may include monitoring resource information of a plurality of base stations including a first base station and a second station, receiving a resource allocation request of a terminal located at a boundary region where cells of the first base station and the second base station are overlapped, determining whether sufficient resources are available to the first base station and the second base station, and when sufficient resources are available to the first base station and the second base station, allocating the same resource to the first base station and the second base station to enable the first base station and the second base station to provide the same voice service to the terminal.

The terminal may be a terminal using the voice service in the boundary region.

In the allocating of the same resource to the first base station and the second base station, resources having the same resource allocation position and transmission scheme may be allocated.

Advantageous Effects

According to at least one embodiment, stable voice service quality may be guaranteed and degradation in data service quality may be minimized although voice and data traffic are mixed. According to at least one embodiment, the voice service is provided with minimum resource by sharing inter-cell resource information. Therefore, the number of users of the voice service may be increased.

MODE FOR INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the present specification, a terminal may be referred to as a mobile station (MS), a mobile terminal (MT), a subscriber station (SS), a portable subscriber station (PSS), user equipment (UE), an access terminal (AT), or the like, and may include all or a portion of functions of the MS, the MT, the SS, the PSS, the UE, the AT, and the like.

In the present specification, a base station (BS) may be referred to as an access point (AP), a radio access station (RAS), a NodeB, an evolved NodeB (eNodeB), a base transceiver station (BTS), a mobile multihop relay (MMR)-BS, or the like, and may include all or a portion of functions of the AP, the RAS, the NodeB, the eNodeB, the BTS, the MMR-BS, and the like.

Hereinafter, a method and an apparatus for resource allocation according to at least one exemplary embodiment will be described with reference to the drawings.

Figure 1:
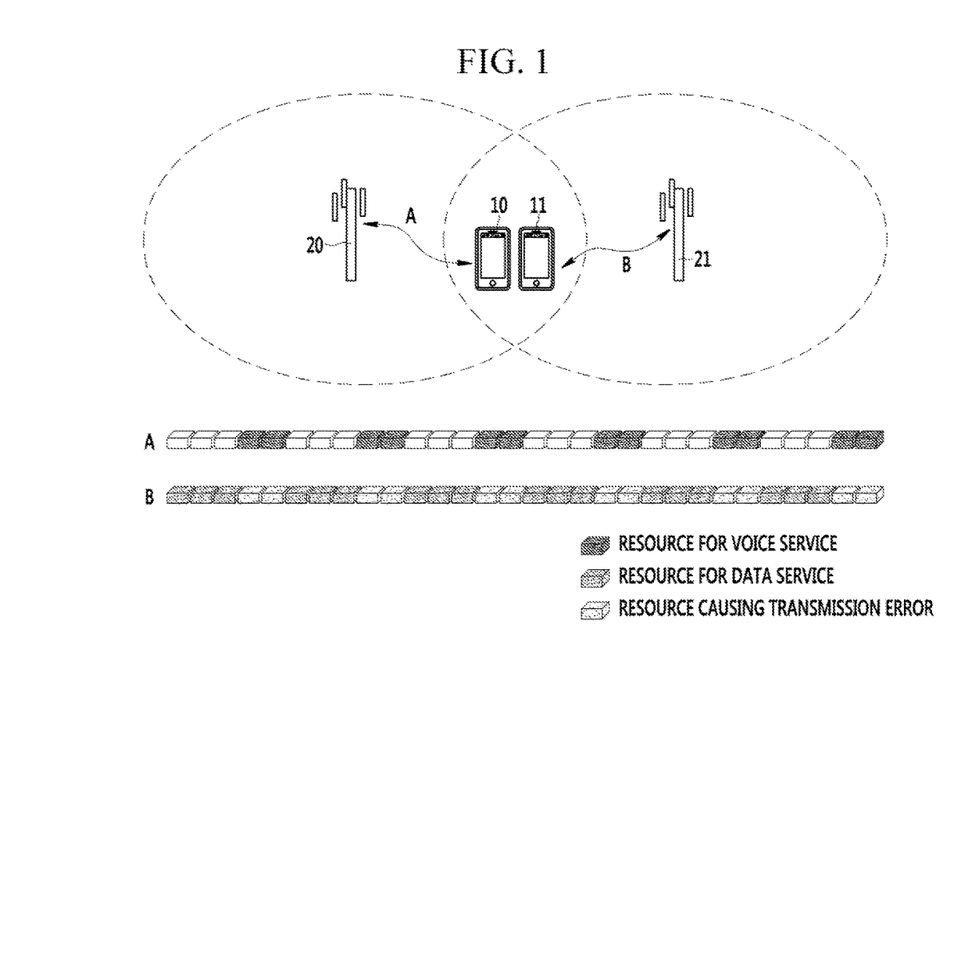
FIG. 1 is a diagram for describing a scheme for independent resource allocation.

FIG. 1 is a diagram for describing an independent resource allocation scheme.

Referring to FIG. 1, a base station 20 and a base station 21 are adjacent to each other and cells thereof have an overlapped portion. A terminal 10 may be connected to the base station 20 to use a voice service, and a terminal 11 may be connected to the base station 21 to use a data service.

The base station 20 and the base station 21 may independently allocate resources while not sharing resource allocation information of the neighbor base station. For example, the base station 20 periodically allocates resources for the voice service of the terminal 10, and the base station 21 dynamically allocates resources for the data service of the terminal 11.

The base station 20 allocates one resource per 20 ms for the voice service. The base station 20 does not know resource allocation information of a neighbor cell. Accordingly, the base station 20 allocates radio resources more than needed, as shown in A of FIG. 1, in order to reduce interference that may be generated by influence of the neighbor cell.

In addition, the base station 21 does not know resource allocation information of the neighbor cell and may allocate resources, as shown in B of FIG. 1, which are overlapped with the resource allocated for the voice service by the neighbor cell. Such allocation may cause a transmission error. Due to the transmission error, the base station 21 needs to retransmit data or transmit a small quantity of data. In addition, since the base station 21 reduces a data transmission amount after the transmission error occurs, the base station 21 transmits data with a reduced data transmission amount in spite of good environment. Consequently, data transmission efficiency of the base station 21 is degraded.

Hereinafter, a resource allocation method for overcoming the above described problem generated by the independent resource allocation will be described.

Figure 2:
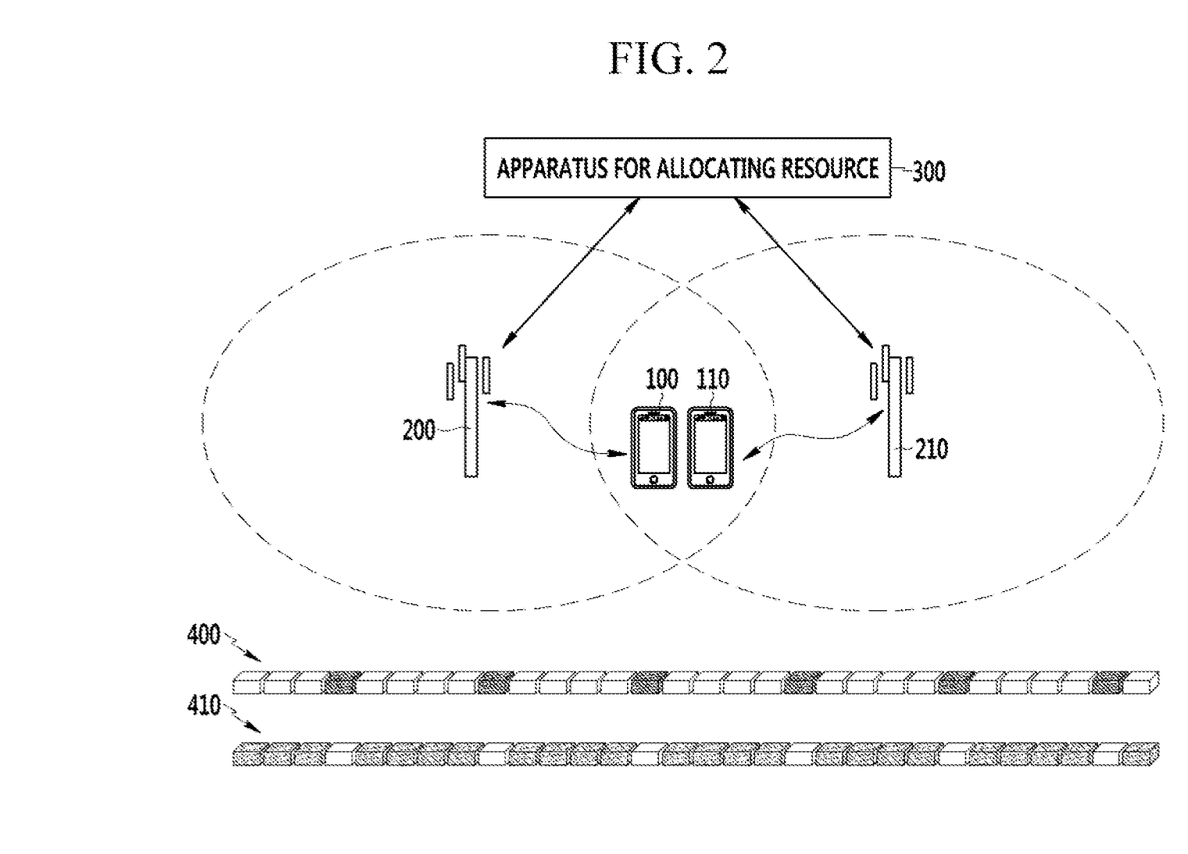
FIGS. 2 and 3 are drawings for describing a method for allocating resources according to at least one exemplary embodiment.
Figure 3:
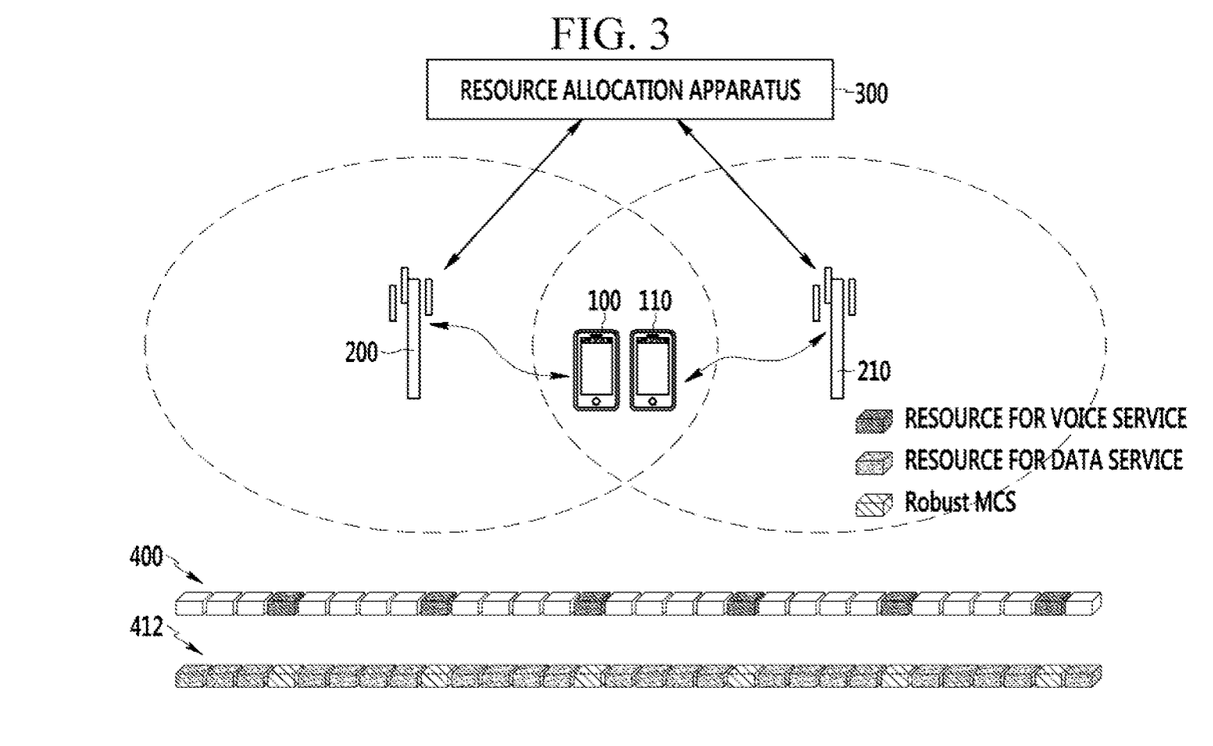

FIGS. 2 and 3 are drawings for describing a method for allocating resources according to at least one exemplary embodiment.

Referring to FIG. 2, a mobile communication system includes a plurality of terminals (or mobile stations or user equipment) 100 and 110, a plurality of base stations 200 and 210, and a resource application apparatus 300 for allocating resources.

The terminals 100 and 110 are wirelessly connected to the base stations 200 and 210 to use at least one of the voice service such as Voice over IP (VoIP) and the data service. Here, it is assumed that the terminal 100 is connected to the base station 200 to use a voice service and the terminal 110 is connected to the base station 210 to use the data service.

The respective base stations 200 and 210 manage cells having a predetermined size. The base stations 200 and 210 may be radio units (RUs) that form radio links with the terminals 100 and 110 within the cells to thereby provide a communication service. The base station 200 and the base station 210 are adjacent to each other as neighbor base stations and cells thereof have an overlapped portion. The terminal 100 and the terminal 110 are located in a boundary region of the cells of the base station 200 and the base station 210.

The resource allocation apparatus 300 may allocate resources for enabling the terminal 100 or 110 to be connected to at least one base station 200 or 210. The resource allocation apparatus 300 may allocate the resources according to dynamic scheduling (DS) or semi-persistent scheduling (SPS).

In this case, the resource allocation apparatus 300 integrally manages resources of the plurality of base stations 200 and 210. The resource allocation apparatus 300 may be a digital unit (DU) connected to the base stations 200 and 210 by a virtualization technology to perform digital signal processing. For convenience and ease of understanding, the apparatus 300 is described as managing resources of two base stations 200 and 210 but the present invention is not limited thereto. The apparatus 300 may integrally manage numerous base stations connected thereto by the virtualization technology.

The resource allocation apparatus 300 may allocate resources 400 to the terminal 100 at predetermined intervals for the voice service. The resource allocation apparatus 300 may allocate the resources for the voice service by the semi-persistent scheduling using a fixed resource allocation position and a fixed transmission scheme (modulation and coding scheme). In this case, the apparatus 300 allocates only the resources necessary for the voice service without allocating radio resources more than needed as described with reference to FIG. 1.

The resource allocation apparatus 300 may allocate resources 410 to the terminal 110 without using the resources 400 allocated to the terminal 100.

Referring to FIG. 3, the resource allocation apparatus 300 may allocate resources 412 to the terminal 110 in consideration of the resources 400 allocated to the terminal 100. For example, the apparatus 300 may allocate resources to the terminal 110 while avoiding the resources 400 for the terminal 100. For the same positions as the resources 400 for the terminal 100, the apparatus 300 may allocate resources using a low level modulation and coding scheme (MCS). Here, the low level MCS is a robust MCS and is referred to as a scheme that performs the modulation and coding at a low channel code rate. Therefore, since the resources allocated by the robust MCS have the low level MCS, a small quantity of data is transmitted, but the data may be securely transmitted. As described, when the resource allocation apparatus 300 allocates the resources to the terminal 110 connected to the base station 210, the resource allocation apparatus 300 not only consider resource information of the base station 210 but also uses resource information of the neighbor base station 200. Therefore, even though the neighbor base stations 200 and 210 are physically independent from each other, the neighbor base stations 200 and 210 may avoid mutual interference because the resource allocation apparatus 300 integrally performs resource management, FIG. 4 is a drawing for describing a method for allocating resources according to another exemplary embodiment, and FIG. 5 is a drawing schematically showing coordinated scheduling according to an exemplary embodiment.

Figure 4:
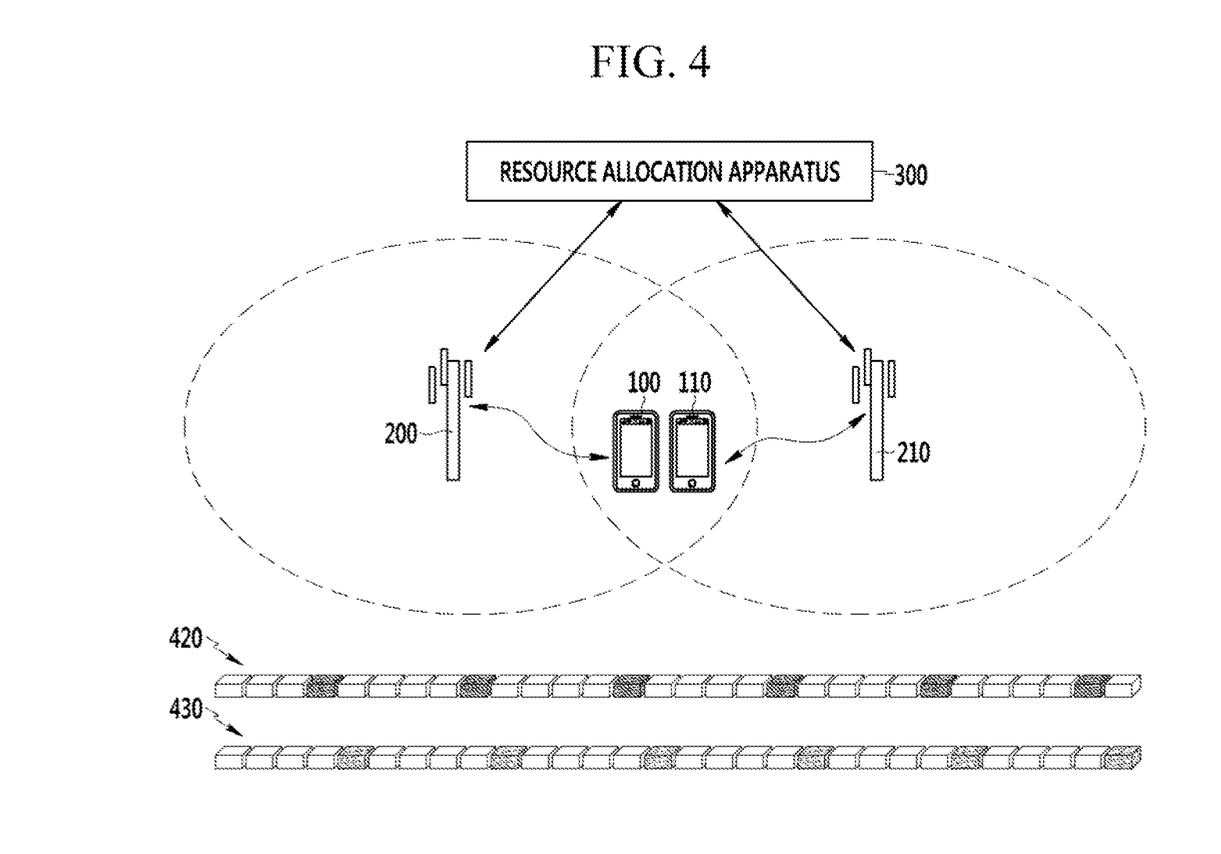
FIG. 4 is a drawing for describing a method for allocating resources according to another exemplary embodiment.
Figure 5:
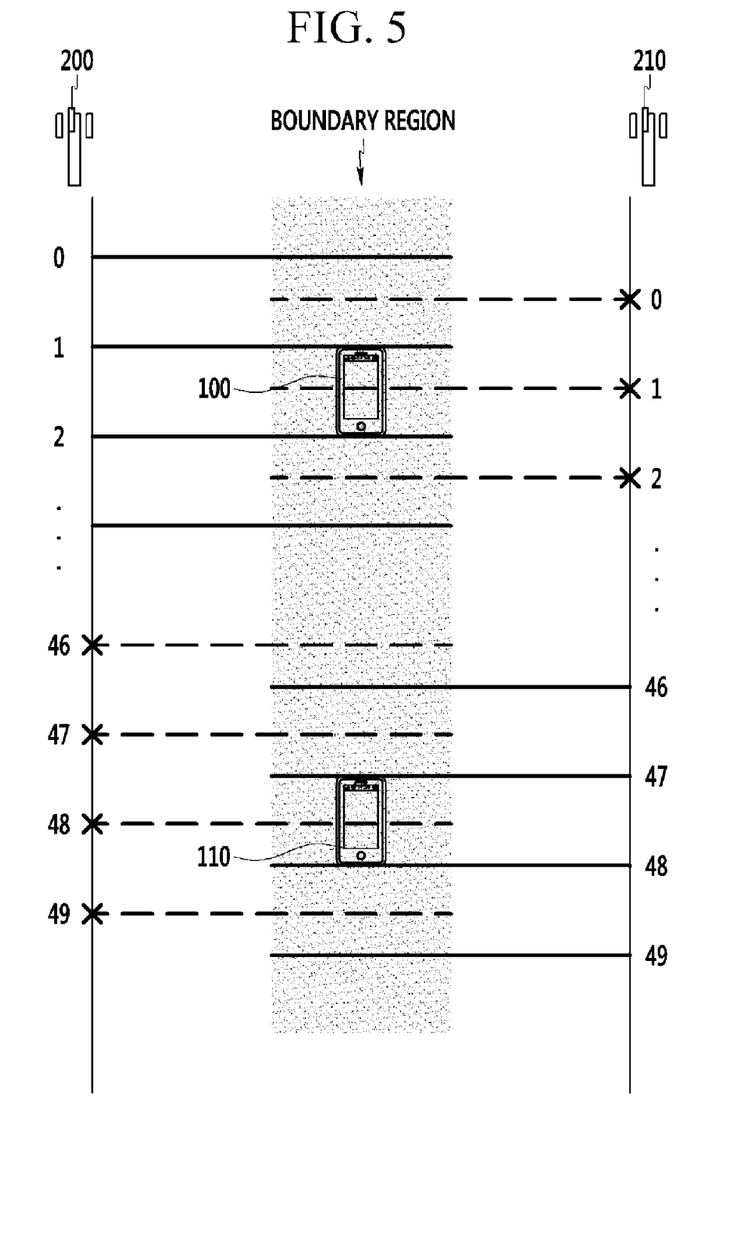
FIG. 5 is a drawing for schematically showing coordinated scheduling according to at least one exemplary embodiment.

Referring to FIG. 4, a base station 200 and a base station 210 are adjacent to each other as neighbor base stations and cells thereof have an overlapped portion. The terminal 100 and the terminal 110 are located in a boundary region of cells of the base station 200 and the base station 210. It is assumed that the terminal 100 is connected to the base station 200 to use a voice service and the terminal 110 is connected to the base station 210 to use the voice service.

The resource allocation apparatus 300 may integrally manage resource information of the base stations 200 and 210 and allocate resources to the respective base stations 200 and 210 based on the resource information of the base stations 200 and 210.

The resource allocation apparatus 300 may allocate resources 420 for the terminal 100 regularly at predetermined intervals for the voice service. For example, the resource allocation apparatus 300 allocates the resources 420 regularly at a predetermined interval, for example, per 20 ms. The resource allocation apparatus 300 may allocate minimum resources necessary for the voice service.

The resource allocation apparatus 300 may allocate resources 430 for the terminal 110 so as not to be overlapped with the resources 420 for the terminal 100 in accordance with at least one embodiment.

As described, the resource allocation apparatus 300 may allocate the resources 420 for the terminal 100 and the resources 430 for the terminal 110 so as not to interfere with each other (e.g., a neighbor cell), which is referred to as coordinated scheduling.

Referring to FIG. 5, the terminal 100 and the terminal 110 are located in a boundary region of cells of the base station 200 and the base station 210. In this case, the resource allocation apparatus 300 may allocate resources differently to the terminal 100 and the terminal 110. Therefore, even if the terminal 100 and the terminal 110 are located in the boundary region where the cells are overlapped, they may use a service without interference of the neighbor cell.

Figure 6:
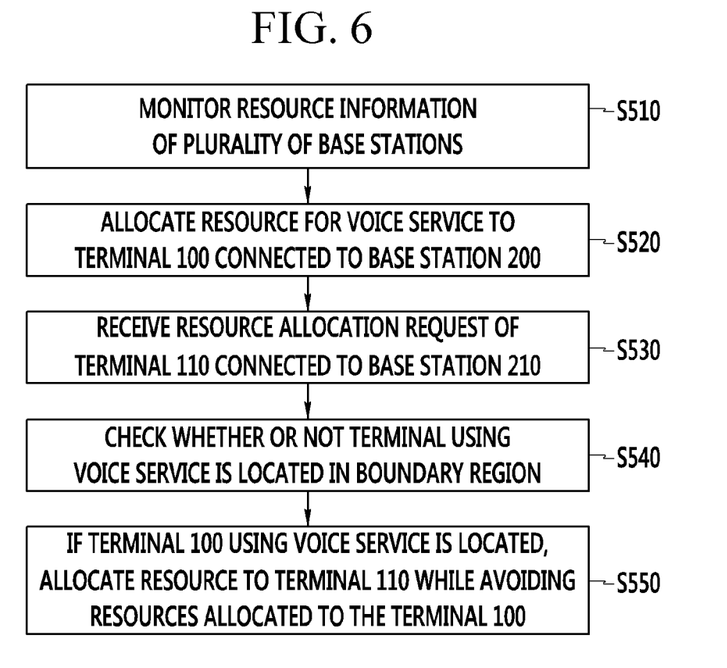
FIG. 6 is a flowchart of a method for allocating resources according to at least one exemplary embodiment.

FIG. 6 is a flowchart of a method for allocating resources according to at least one exemplary embodiment.

Referring to FIG. 6, the resource allocation apparatus 300 monitors resource information of a plurality of base stations 200 and 210 (S510).

The resource allocation apparatus 300 allocates resources for a voice service to a terminal 100 connected to the base station 200 (S520). The terminal 100 is located in a boundary region of the base station 200 and the base station 210. The resource allocation apparatus 300 may allocate the resources using a fixed resource allocation position and a fixed transmission scheme (modulation and coding scheme). In order to enable the terminal 100 to use the voice service, the resource allocation apparatus 300 may periodically allocate minimum resources necessary for the voice service.

The resource allocation apparatus 300 receives a resource allocation request from the terminal 110 connected to the base station 210 (S530). Here, the terminal 110 is located in a boundary region of the base station 200 and the base station 210.

The resource allocation apparatus 300 checks whether the terminal using the voice service is located in the boundary region (S540). The reason of performing the checking operation is follows. Even though the terminals are connected to the different base stations, if the terminals are located in the boundary region, interference may occur by a neighbor base station. Particularly, when the same resources are allocated for the voice service, an interference problem may occur because the resources for the voice service have the fixed positions.

If the terminal 100 using the voice service is located in the boundary region, the resource allocation apparatus 300 allocates the resources to the terminal 110 while avoiding the resources allocated to the terminal 100 using the voice service (S550).

Figure 7:
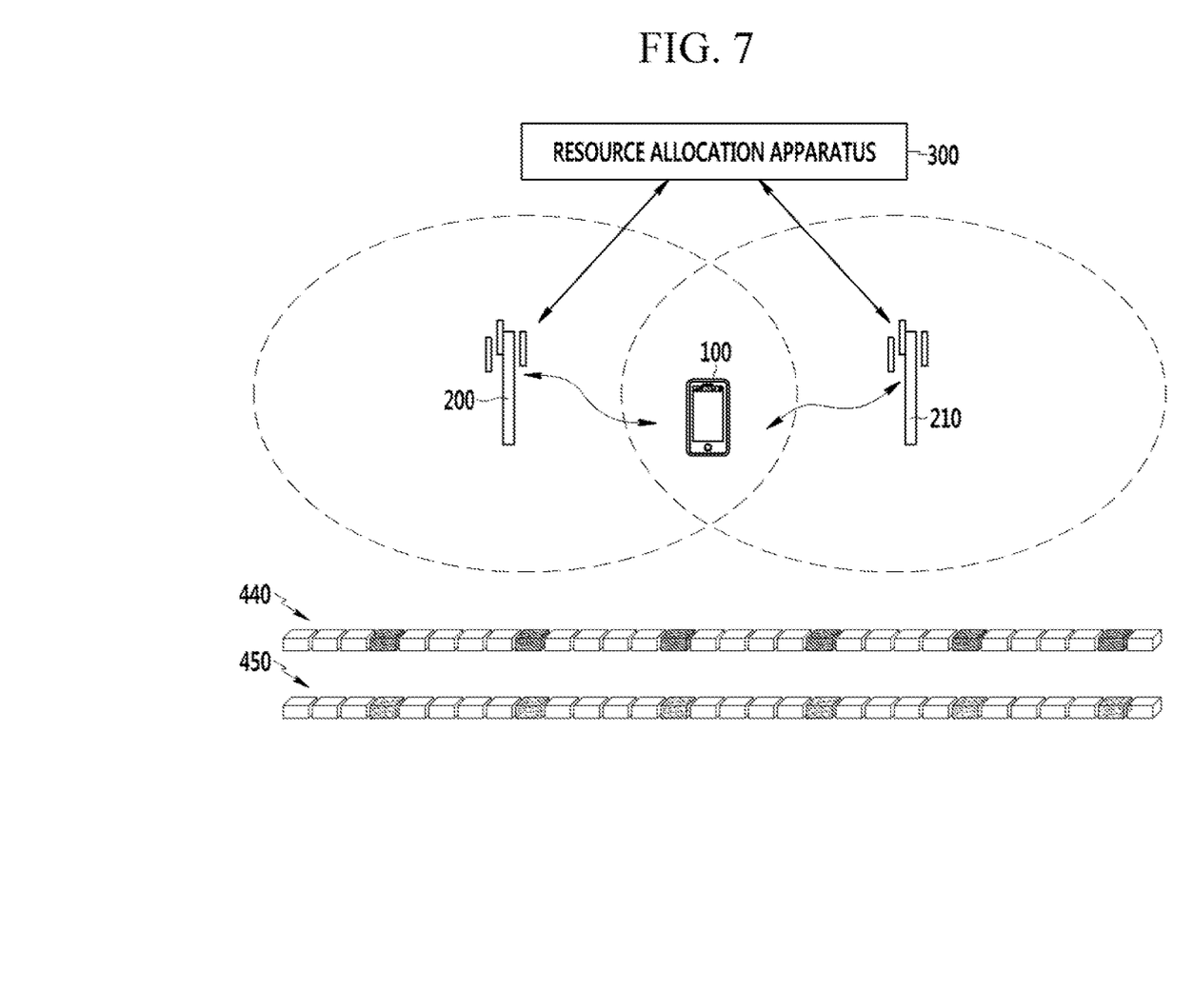
FIG. 7 is a drawing for describing a method for allocating resources according to still another exemplary embodiment.
Figure 8:
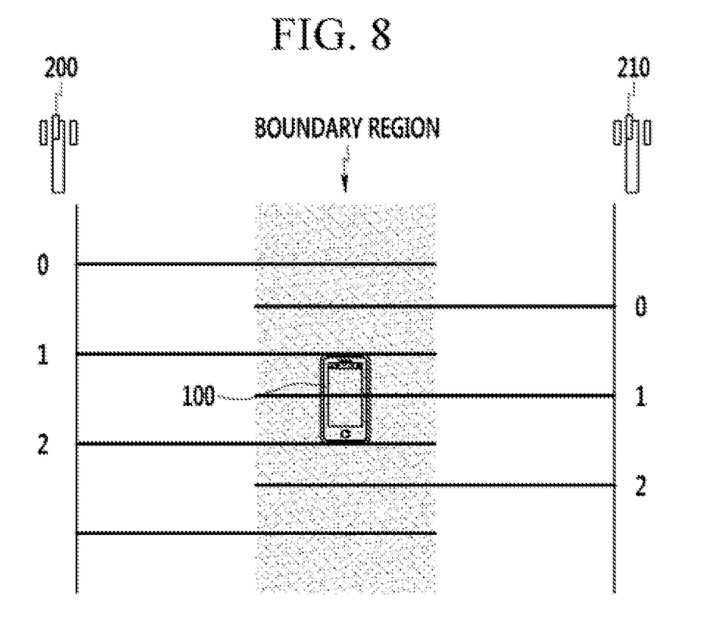
FIG. 8 is a drawing for schematically showing joint scheduling according to at least one exemplary embodiment.

FIG. 7 is a drawing for describing a method for allocating resources according to still another exemplary embodiment, and FIG. 8 is a drawing for schematically showing joint scheduling according to an exemplary embodiment.

Referring to FIG. 7, a base station 200 and a base station 210 are adjacent to each other as neighbor base stations and cells thereof have an overlapped area. The boundary region may be an overlapped area of the cells and may be an edge of the cells managed by the two base stations 200 and 210. Accordingly, the boundary region may be a weak electric field area. Therefore, if the terminal 100 uses the voice service in the boundary region, the terminal 100 may have poor voice service quality.

The resource allocation apparatus 300 integrally manages resources information of the base stations 200 and 210 in accordance with at least one embodiment. In addition, if sufficient resources are available for the base stations 200 and 210, the resource allocation apparatus 300 may allocate the same resources to the terminal 100 so that the two base stations 200 and 210 provide the same voice service to the terminal 100. That is, the resource allocation apparatus 300 allocates fixed resources 440 between the base station 200 and the terminal 100 and also allocates the same fixed resources 450 as the fixed resources 440 between the base station 210 and the terminal 100.

As described above, the resource allocation apparatus 300 allocates the resources 440 and 450 for the voice service of the terminal 100 to both of the neighbor cells. Such a resource allocation may be referred to as joint scheduling.

Referring to FIG. 8, the terminal 100 is located in an overlapped region of the cells of the base station 200 and the base station 210.

In this case, the resource allocation apparatus 300 may allocate the same resources for the terminal 100 to both of the base station 200 and the base station 210. Therefore, when the terminal 100 uses the voice service at the edge of the cells, the terminal 100 may receive voice data from both of the base station 200 and the base station 210. Accordingly, voice service quality at the edge of the cell may be improved.

Figure 9:
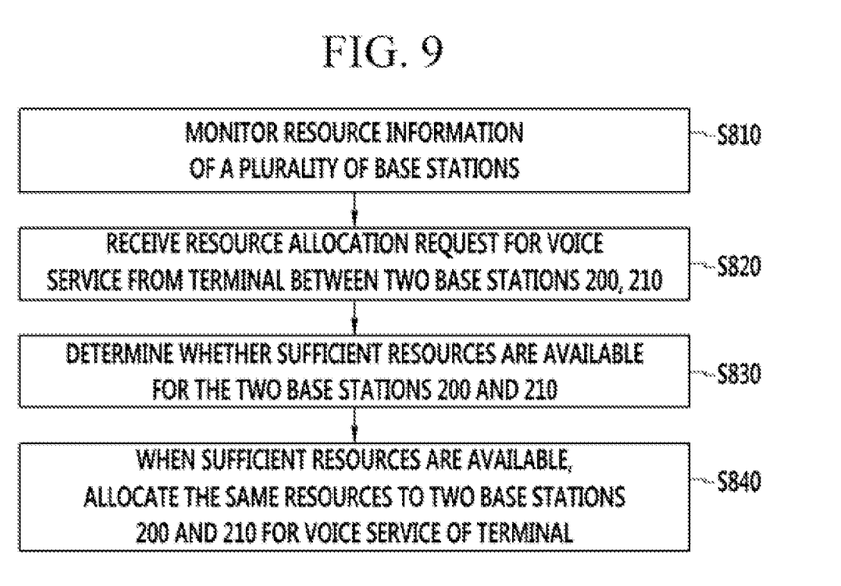
FIG. 9 is a flowchart of a method for allocating resources according to another exemplary embodiment.

FIG. 9 is a flowchart of a method for allocating resources according to another exemplary embodiment.

Referring to FIG. 9, the resource allocation apparatus 300 monitors resource information of a plurality of base stations 200 and 210 (S810).

The resource allocation apparatus 300 receives a resource allocation request for a voice service from a terminal 100 which is located at an overlapped region between the two base stations 200 and 210 (S820).

The resource allocation apparatus 300 determines whether sufficient resources are available for the two base stations 200 and 210 (S830).

When sufficient resources are available, the resource application apparatus 300 allocates the same resources to the two base stations 200 and 210 for the voice service of the terminal 100 (S840).

That is, the resource allocation apparatus 300 allocates fixed resources 440 between the base station 200 and the terminal 100 and also allocates the same fixed resources 450 as the fixed resources 440 between the base station 210 and the terminal 100. The terminal 100 may be provided with a high quality voice service even when the terminal 100 is located at the boundary region of the two base stations 200 and 210.

Figure 10:
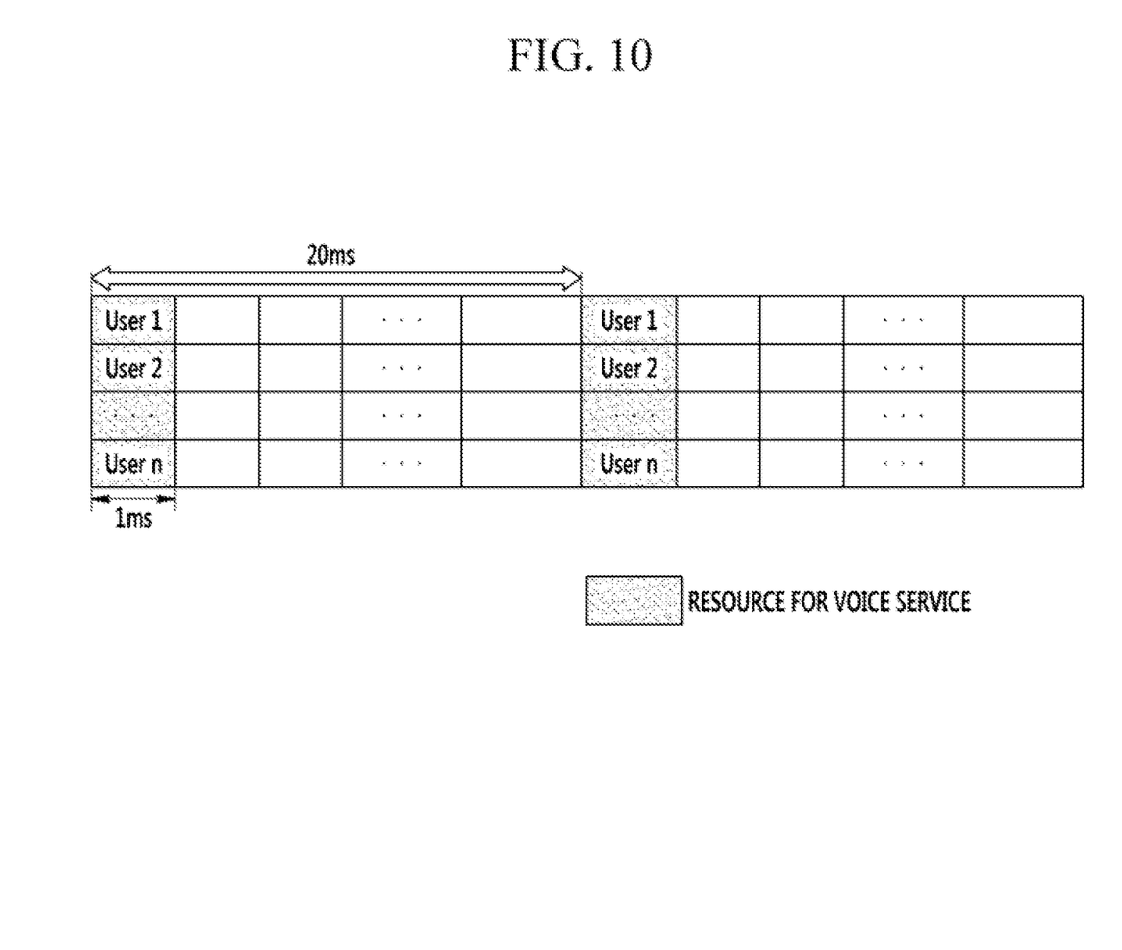
FIG. 10 is a drawing for describing a method for allocating resources for a voice service according to at least one exemplary embodiment.

FIG. 10 is a drawing for describing a method for allocating resources for a voice service according to at least one exemplary embodiment.

Referring to FIG. 10, the resource allocation apparatus 300 may allocate fixed resources at a predetermined interval for the voice service. In this case, the resource allocation apparatus 300 may fix a resource position for the voice service to a certain subframe. For example, when the resources for the voice service are periodically allocated per 20 ms, the resource allocation apparatus 300 may determine a certain subframe of 1 ms as the fixed resource for the voice service.

When there are multiple terminals using the voice service, the resource allocation apparatus 300 may allocate only certain subframe as the resources for the voice service.

When the resources for the voice service are distributed through multiple subframes, the resource allocation apparatus 300 may need to consider all subframes of neighbor cells when allocating resources for a data service. In accordance with at least one embodiment, the resource allocation apparatus 300 gathers the resources for the voice service in the certain subframe and allocates the gathered resources in the certain subframe for the voice service. Accordingly, the resource allocation apparatus 300 does not need to consider all subframes in a neighbor cell. That is, the resource allocation apparatus 300 may only need to allocate the resources for the data service by avoiding the certain subframe allocated for the voice service.

In addition, since the resource allocation apparatus 300 may easily predict interference at the certain subframe, the resource allocation apparatus 300 may allocate resources overlapped with the certain subframe through a low level of MCS. As a result, it is possible to limit the resources causing interference of the voice service and the data service to the certain subframe.

Figure 11:
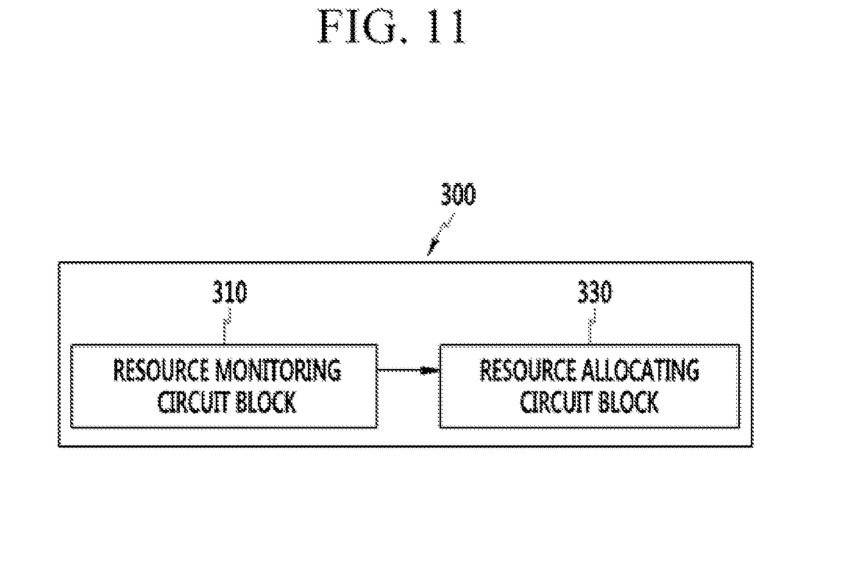
FIG. 11 is a block diagram of an apparatus for allocating resources according to at least one exemplary embodiment.

FIG. 11 is a block diagram for illustrating an apparatus for allocating resources according to at least one exemplary embodiment.

Referring to FIG. 11, the resource allocation apparatus 300 may include a resource monitoring circuit block 310 and a resource allocating circuit block 330.

The resource monitoring circuit block 310 may monitor resources of numerous base stations connected through virtualization, for example, the base stations 200 and 210.

The resource allocating circuit block 330 may allocate resources to a terminal based on the monitoring result of the resource monitoring circuit block 310. In this case, the resource allocating circuit block 330 may allocate fixed resources regularly at a predetermined interval for the voice service. In addition, the resource allocating circuit block 330 may allocate minimum resources necessary for the voice service.

If the terminal in the edge of the cell of the base station requests the resources, the resource allocating circuit block 330 may check whether resources for the voice service are allocated to neighbor terminals. In addition, the resource allocating circuit block 330 may allocate resources to the terminal not to be overlapped with the resources allocated for the voice service.

If the terminal in the edge of the cell of the base station requests resources for the voice service, the resource allocating circuit block 330 may check whether sufficient resources are available for associated base stations adjacent to the terminal. In addition, the resource allocating circuit block 330 may allocate the same resource for the associated base stations for the voice service of the terminal. Therefore, the terminal may receive voice data from a plurality of the associated base stations. In accordance with at least one embodiment, stable voice service quality may be guaranteed and degradation in the data service quality may be minimized although the voice and data traffic are mixed, Furthermore, the number of users for the voice service may be increased since the voice service is provided with using he minimum resource by sharing inter-cell resource information.

The exemplary embodiments of the present invention described above are not only implemented by the apparatus and the method, but may be implemented by a program or a recording medium having the program recorded therein that realizes functions corresponding to the configurations of the exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating resources, the method comprising:
   monitoring resource information of a plurality of base stations including a first base station and a second base station;
   receiving a resource allocation request from a first terminal that is located in a boundary region and connected to the first base station;
   checking whether a second terminal is connected to the second base station, whether the second terminal uses a voice service, and whether the second terminal is located in the boundary region; and
   when the second terminal is connected to the second base station, uses the voice service, and is located in the boundary region, allocating resources to the first terminal based on interference with resources allocated to the second terminal,
   wherein the boundary region is an overlapped region of cells of the first base station and the second base station, and
   wherein the allocating of the resources of the first terminal comprising
   for positions different from resources allocated to the second terminal, allocating resources to the first terminal using a first level of a modulation and coding scheme and
   for positions identical to the resources allocated to the second terminal, allocating resources to the first terminal using a second level of a modulation and coding scheme, which is lower than the first level of the modulation and coding scheme; and
   the second level of the modulation and coding scheme is a scheme transmitting less data than the first level of the modulation and coding scheme.

2. The method of claim 1, wherein the resources allocated to the second terminal are resources allocated at a predetermined interval with a fixed resource allocation position and a fixed transmission scheme.

3. The method of claim 1, wherein in the allocating of the resources of the first terminal, the resources of the first terminal are allocated while avoiding the resources allocated to the second terminal.

4. A method for allocating resources, the method comprising:
   receiving a resource allocation request for a voice service of a first terminal connected to a first base station;
   allocating first resources having a fixed resource allocation position and a fixed transmission scheme to the first terminal;
   receiving a resource allocation request of a second terminal which is connected to the second terminal; and
   checking whether the second terminal is located in an overlapped region of cells of the first base station and the second base station;
   when the second terminal is located in the overlapped region, checking whether the first terminal using the voice service is located in the overlapped region; and
   when the first terminal is located in the overlapped region, allocating second resources different from the first resources to the second terminal, and
   wherein the allocating of the first resources of the first terminal comprising
   for positions different from resources allocated to the second terminal, allocating resources to the first terminal using a first level of a modulation and coding scheme and
   for positions identical to the resources allocated to the second terminal, allocating resources to the first terminal using a second level of a modulation and coding scheme, which is lower than the first level of the modulation and coding scheme; and
   the second level of the modulation and coding scheme is a scheme transmitting less data than the first level of the modulation and coding scheme.

5. The method of claim 4, further comprising monitoring resource information of a plurality of base stations including the base stations connected to the first terminal and the second terminal.

6. The method of claim 4, wherein:
   the first terminal is connected to a first base station;
   the second terminal is connected to a second base station; and
   the first terminal and the second terminal are located at a boundary region where cells of the first base station and the second base station are overlapped.

7. The method of claim 4, wherein the allocating of the first resources includes:
   fixing resource positions of the voice service to a certain subframe; and
   allocating the first resources for the voice service of the first terminal to the certain subframe,
   wherein the certain subframe is a subframe which is repeated at a predetermined interval.

8. The method of claim 7, wherein, in the allocating of the second resources, the second resources are allocated to the second terminal for the data service while avoiding the certain subframe.

9. The method of claim 7, further comprising:
   receiving a resource allocation request for a voice service of a third terminal; and
   allocating third resources for the voice service of the third terminal to the certain subframe.

* * * * *